United States Patent Office 3,048,585
Patented Aug. 7, 1962

3,048,585
N-ARALKYLIDENEAMINOMALEIMIDES
John H. Billman, Bloomington, Ind., and
Donald B. Borders, Urbana, Ill.
No Drawing. Filed Oct. 25, 1960, Ser. No. 64,700
6 Claims. (Cl. 260—240)

This invention relates to new N-aralkylideneaminomaleimides which have useful therapeutic activity.

More specifically the N-aralkylideneaminomaleimides of this invention have utility as chemotherapeutic agents particularly as antifungal agents and also as antibacterial agents. The compounds of this invention are especially effective against the following organisms: *Blastomyces dermatitidis, Epidermophyton floccosum, Trichophyton mentagrophytes, Microsporum audouini, Histoplasma capsulatum, Cryptococcus neoformans* and *Candida albicans*.

The novel compounds of this invention are represented by the following fundamental formula:

Formula I

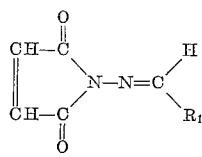

when: $R_1$ represents styryl or

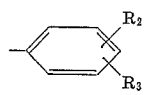

and $R_2$ and $R_3$ represent hydrogen, hydroxy, acetoxy, lower alkoxy, lower alkyl, halo having an atomic weight of less than 80, amino, lower alkylamino, di-lower alkylamino, nitro and, when on adjacent carbon atoms and taken together, methylenedioxy.

Preferred compounds of this invention are those of Formula I in which $R_2$ and $R_3$ represent hydrogen.

The terms "lower alkyl" or "lower alkoxy" where used herein indicate moieties with 1 to 4 carbon atoms, preferably methyl.

The N-aralkylideneaminomaleimides of this invention are prepared by the following procedure:

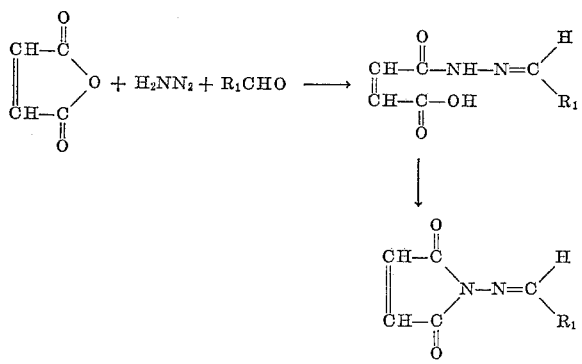

The maleic anhydride, hydrazine and aldehyde derivative are reacted in a suitable cyclic ether or acid solvent such as dioxane-water, formic acid-water, acetic acid-water or, most advantageously, glacial acetic acid at a reaction temperature of from about 15° C. to about 45° C.

Preferably, substantially equivalent molar quantities of the reactants are mixed in the following sequence: hydrazine, in the form of its hydrate dissolved in a suitable cyclic ether or acid solvent or in the form of a salt such as sulfate or hydrochloride in aqueous solution, is treated with a solution of the aldehyde and to this mixture is added the maleic anhydride. During the additions the reaction mixture is maintained at about 15° C. to about 45° C. and then allowed to stand at room temperature until a sample of the solid product is almost completely soluble in a 25% aqueous solution of sodium bicarbonate. The solid product is then isolated by filtration to give the maleic acid, aralkylidenemonohydrazide intermediate.

This hydrazide intermediate is treated with an anhydride of a lower saturated fatty acid such as propionic, butyric or, preferably, acetic anhydride, in the presence of an anhydrous alkali metal salt of a lower saturated fatty acid, such as potassium acetate, sodium propionate, lithium acetate or, preferably, sodium acetate. Advantageously an excess of the anhydride over the hydrazide intermediate is employed and the alkali metal salt is present in an amount of from about 5 to 25% of the weight of the anhydride. The reaction is carried out at elevated temperature, preferably about 60° C. to about 100° C. for a period of from about 10 to 60 minutes. The reaction mixture is conveniently worked up by pouring it into cold water and isolating the N-aralkylideneaminomaleimide by filtration.

It will be apparent to one skilled in the art that the compounds of this invention may be present as stereoisomers. The connotation of the general formula presented herein is to include all isomers, the syn and anti isomers as well as the mixture of these isomers.

The following examples are not limiting but are illustrative of compounds of this invention and the procedures for their preparation and will serve to make fully apparent all of the compounds embraced by the general formula given above.

Example 1

Benzaldehyde (21.2 g.) in 100 ml. of glacial acetic acid is added slowly with stirring to 10.0 g. of hydrazine hydrate in 50 ml. of glacial acetic acid. To this mixture is added a mixture of 19.6 g. of maleic anhydride in 100 ml. of glacial acetic acid keeping the temperature below 40° C. Samples of the solid which forms in the reaction mixture are removed at intervals. When the solid is almost completely soluble in 25% aqueous sodium bicarbonate, the mixture is filtered, washed with ether and dried to give maleic acid, benzylidenemonohydrazide, M.P. 176° C.

A mixture of 10.9 g. of the above prepared monohydrazide, 1.5 g. of fused sodium acetate and 6.0 g. of acetic anhydride is heated at 80° C. with stirring for one hour. The mixture is cooled and poured into ice water. After three hours the solid, yellow product is filtered off, washed with water, dried and recrystallized from benzene to give N-benzylideneaminomaleimide, M.P. 121–127° C.

Example 2

A mixture of 26.4 g. of cinnamaldehyde and 125 ml. of glacial acetic acid is treated with 10.0 g. of hydrazine hydrate in 50 ml. of glacial acetic acid, then with 19.6 g. of maleic anhydride in 100 ml. of glacial acetic acid. When a sample of the solid is almost completely soluble in 25% aqueous sodium bicarbonate, the mixture is filtered. The solid product is washed with ether and dried to give maleic acid, cinnamylidenemonohydrazide.

A mixture of 12.2 g. of maleic acid, cinnamylidenemonohydrazide, 1.5 g. of fused sodium acetate and 6.5 g. acetic anhydride is heated at 80° C. for 30 minutes with stirring, then cooled to room temperature and poured into ice water. Working up as in Example 1 gives N-cinnamylideneaminomaleimide.

Example 3

Treating a mixture of 16.4 g. of p-acetoxybenzaldehyde and 5.0 g. of hydrazine hydrate in glacial acetic acid solution with 9.8 g. of maleic anhydride and working up as in Example 1 gives maleic acid, p-acetoxybenzylidenemonohydrazide.

A mixture of 13.8 g. of the above prepared hydrazide, 1.5 g. of fused sodium acetate and 7.0 g. of acetic anhydride is heated at 85° C. for 20 minutes, then cooled to room temperature and poured into ice water. After three hours the solid material is filtered, washed with water and recrystallized from ligroin to give N-p-acetoxybenzylideneaminomaleimide, M.P. 158.5–164.5° C.

Example 4

A solution of 5.0 g. of hydrazine hydrate in 25 ml. of glacial acetic acid is treated with 13.6 g. of p-anisaldehyde in 75 ml. of glacial acetic acid and to the resulting mixture is added 9.8 g. of maleic anhydride in 50 ml. of glacial acetic acid keeping the temperature below 40° C. When samples of the solid which forms are nearly completely soluble in 25% sodium bicarbonate solution, the mixture is filtered. The solid product is maleic acid, p-anisylidenemonohydrazide.

A mixture of 12.4 g. of this hydrazide, 6.5 g. of acetic anhydride and 1.3 g. of fused sodium acetate is heated at 80° C. for 30 minutes, then cooled and poured into ice water. After three hours the mixture is filtered. The solid product is washed with water and recrystallized from benzene to give N-p-anisylideneaminomaleimide.

Example 5 p-Dimethylaminobenzaldehyde (14.9 g.) in 75 ml. of glacial acetic acid is added slowly with stirring to 5.0 g. of hydrazine hydrate in 25 ml. of glacial acetic acid. To this mixture is added 9.8 g. of maleic anhydride in 50 ml. of glacial acetic acid. Working up as in Example 4 gives maleic acid, p-dimethylaminobenzylidenemonohydrazide.

A mixture of 6.5 g. of the above prepared hydrazide, 3.0 g. of acetic anhydride and 0.5 g. of fused sodium acetate is heated at 85–90° C. for 15 minutes, then allowed to stand at room temperature for one hour. The mixture is poured into ice water and the preciptate which forms is filtered off, washed with water and recrystallized from benzene-ligroin to give N-p-dimethylaminobenzylideneaminomaleimide.

Example 6

Maleic anhydride (9.8 g.) is added to a mixture of 19.4 g. of 4-acetoxy-3-methoxybenzaldehyde, 5.0 g. of hydrazine hydrate and 150 ml. of glacial acetic acid. Samples of the precipitate are removed at intervals until the sample is soluble in 25% sodium bicarbonate solution. Then the mixture is filtered. The product is washed with ether and dried to give maleic acid, 4-acetoxy-3-methoxybenzylidenemonohydrazide.

The above prepared hydrazide (6.0 g.), acetic anhydride (2.2 g.) and 0.4 g. of fused sodium acetate are heated at 85–90° C. for 10 minutes, then allowed to stand at room temperature for one hour. The mixture is poured into ice water. After three hours, the precipitate is filtered, washed with water and recrystallized from benzene-ligroin to give N-(4-acetoxy-3-methoxybenzylidene)aminomaleimide, M.P. 155.5–162.5° C.

Example 7

Treatment of one mole of m-nitrobenzaldehyde with one mole of hydrazine hydrate and one mole of maleic anhydride in glacial acetic acid solution gives maleic acid, m-nitrobenzylidenemonohydrazide.

A mixture of 13.0 g. of this hydrazide, 5.5 g. of acetic anhydride and 1.0 g. of fused sodium acetate is heated at 80° C. for one hour, then cooled and poured into ice water. The precipitate is filtered off, washed with water and recrystallized from benzene-ligroin to give N-m-nitrobenzylideneaminomaleimide.

Example 8

Piperonal (15.0 g.) is treated with 5.0 g. of hydrazine hydrate and 9.8 g. of maleic anhydride in glacial acetic acid to give maleic acid, piperonylidenemonohydrazide.

Heating this hydrazide (13.0 g.), 6.0 g. of acetic anhydride and 1.0 g. of fused sodium acetate for 45 minutes at 80° C., cooling the reaction mixture, pouring it into ice water and working up as in Example 7 gives an orange solid, N - piperonylideneaminomaleimide, M.P. 201–211° C.

Example 9

A mixture of 12.2 g. of salicylaldehyde, 5.0 g. of hydrazine hydrate and 100 ml. of glacial acetic acid is treated with 9.8 g. of maleic anhydride. The reaction mixture is worked up as in Example 6 to give maleic acid, salisylidenemonohydrazide.

A mixture of 11.7 g. of the above prepared hydrazide, 7.0 g. of propionic anhydride and 1.5 g. of fused sodium propionate is heated at 85–90° C. for 30 minutes, then cooled and poured into ice water. The precipitate is washed with water and recrystallized from benzene to give N-salicylideneaminomaleimide.

Example 10

Treatment of p-chlorobenzaldehyde with one equivalent of hydrazine hydrate in glacial acetic acid and subsequently with one equivalent of maleic anhydride gives maleic acid, p-chlorobenzylidenemonohydrazide.

A mixture of 25.2 g. of the above prepared hydrazide, 12.0 g. of acetic anhydride and 1.5 g. of fused sodium acetate is heated at 80° C. for 45 minutes. The mixture is cooled, poured into ice water and allowed to stand for one hour. The precipitate is isolated by filtration, washed with water and recrystallized from benzene-ligroin to give N-p-chlorobenzyladeneaminomaleimide.

Example 11

A mixture of 20.0 g. of 4-amino-2-bromobenzaldehyde, 5.0 g. of hydrazine hydrate and 125 ml. of glacial acetic acid is treated with 9.8 g. of maleic anhydride. When a sample of the precipitate is soluble in 25% sodium bicarbonate solution, the mixture is filtered. The product is washed with ether and dried to give maleic acid, 4-amino-2-bromobenzylidenemonohydrazide.

The above prepared hydrazide (15.0 g.), acetic anhydride (6.0 g.) and fused sodium acetate (1.0 g.) are heated at 85–90° C. for 20 minutes, then cooled to room temperature and poured into ice water. After standing for two hours, the precipitate is filtered off and recrystallized from benzene to give N-(4-amino-2-bromobenzylidene)aminomaleimide.

Example 12

Treatment of p-fluorobenzaldehyde with one equivalent of hydrazine hydrate and one equivalent of maleic anhydride in glacial acetic acid gives maleic acid, p-fluorobenzylidenemonohydrazide.

A mixture of 23.6 g. of this hydrazide, 11.0 g. of acetic anhydride and 2.0 g. of fused sodium acetate is heated at 90° C. for 10 minutes, then allowed to stand at room temperature for one hour and poured into ice water. The precipitate is N-p-fluorobenzylideneaminomaleimide.

Example 13 m-Tolualdehyde is reacted with one equivalent of hydrazine hydrate and one equivalent of maleic anhydride in glacial acetic acid to give maleic acid, m-methylbenzylidenemonohydrazide.

Twenty-three grams of the above prepared hydrazide, 12.0 g. of acetic anhydride and 2.0 g. of fused sodium acetate are heated at 70° C. for 45 minutes, then cooled and poured into water. Working up as in Example 11 yields N-m-methylbenzylideneaminomaleimide.

Example 14

A mixture of 14.5 g. of maleic acid, p-butoxybenzylidenemonohydrazide (prepared by reacting p-butoxybenzaldehyde with one equivalent of hydrazine hydrate and one equivalent of maleic anhydride), 6.0 g. of acetic anhydride and 1.2 g. of fused sodium acetate are heated at 85–90° C. for 30 minutes. Cooling, pouring into ice water, and, after standing for three hours, filtering off the product gives N-p-butoxybenzylideneaminomaleimide.

*Example 15*

Treating 16.2 g. of p-butylbenzaldehyde with 5.0 g. of hydrazine hydrate and 9.8 g. of maleic anhydride gives maleic acid, p-butylbenzylidenemonohydrazide. This hydrazide (27.4 g.), acetic anhydride (11.0 g.) and 1.6 g. of fused sodium acetate are heated at 85° C. for 20 minutes. The mixture is cooled and poured into water. The precipitate is N-p-butylbenzylideneaminomaleimide.

*Example 16*

A mixture of 13.4 g. of o-methylaminobenzaldehyde and 5.0 g. of hydrazine hydrate in glacial acetic acid is treated with 9.8 g. of maleic anhydride. Samples of the precipitate are removed at intervals until a sample is obtained which is soluble in 25% sodium bicarbonate solution. Then the mixture is filtered and the precipitate is washed with ether and dried to give maleic acid, o-methylaminobenzylidenemonohydrazide.

This hydrazide (12.3 g.) acetic anhydride (6.5 g.) and fused sodium acetate (1.2 g.) are heated at 85° C. for 15 minutes, then cooled to room temperature and poured into ice water. After three hours, the precipitate is filtered off, washed with water and recrystallized from benzene-ligroin to give N-o-methylaminobenzylideneaminomaleimide.

What is claimed is:

1. A chemical compound of the fundamental formula:

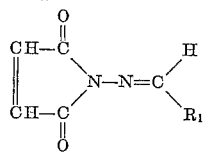

in which $R_1$ is a member selected from the group consisting of styryl and

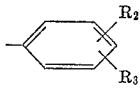

and $R_2$ and $R_3$ are members selected from the group consisting of hydrogen, hydroxy, acetoxy, lower alkoxy, lower alkyl, halo having an atomic weight of less than 80, amino, lower alkylamino, di-lower alkylamino, nitro and, when on adjacent carbon atoms and taken together, methylenedioxy, said lower alkyl and lower alkoxy moieties having 1–4 carbon atoms.

2. N-benzylideneaminomaleimide.
3. N-cinnamylideneaminomaleimide.
4. N-p-acetoxybenzylideneaminomaleimide.
5. N-p-anisylideneaminomaleimide.
6. N-p-dimethylaminobenzylideneaminomaleimide.

References Cited in the file of this patent

FOREIGN PATENTS 176,563    Austria _____ Nov. 10, 1953

OTHER REFERENCES

Duden: Ber. d. Deut. Chem. Ges., vol. 26, page 121 (1893).

Foersterling: J. für Prakt. Chem., vol. 51 (NF), pages 375 and 390–1 (1895).

Curtius: J. für Prakt. Chem., vol 92 (NF), pages 102–4 (1915).

Caronna: Gazz. Chim. Ital., vol. 77, page 428 (1947).

Feuer et al.: J. Am. Chem. Soc., vol 80, pages 3790–2 (1958).

Flett et al.: "Maleic Anhydride Derivatives," pages 148–9, John Wiley and Sons (1952).